United States Patent [19]
Satake

[11] 3,857,333
[45] Dec. 31, 1974

[54] HULLER

[76] Inventor: Toshihiko Satake, 2-38, Saijyo-cho, Nishihon-machi, Kamo-gun, Hiroshima-ken, Japan

[22] Filed: Apr. 5, 1973

[21] Appl. No.: 348,306

[52] U.S. Cl. ................ 99/601, 99/609, 99/619, 130/27 F, 198/220 BA, 209/480, 241/80
[51] Int. Cl. .................... B02b 3/04, B07b 13/08
[58] Field of Search ............ 99/488, 518–521, 99/524, 525, 529, 539, 567–569, 600–602, 604, 609, 611, 618, 619; 130/27 F, 27 G; 241/6, 7, 9, 10, 79.1, 80; 209/116, 466, 480, 499; 198/220 BA, 33 AA, 254–256

[56] References Cited
UNITED STATES PATENTS

| | | | |
|---|---|---|---|
| 1,980,837 | 11/1934 | Tracy | 99/520 |
| 2,128,848 | 8/1938 | Rafetto | 241/80 |
| 2,958,421 | 11/1960 | Kleiser | 209/480 |
| 3,016,203 | 1/1962 | Sears et al. | 241/80 |
| 3,080,056 | 3/1963 | Dreyfus et al. | 209/466 |
| 3,105,040 | 9/1963 | Wood | 209/466 |
| 3,402,895 | 9/1968 | Willmann | 241/80 |
| 3,572,492 | 3/1971 | Dreszig | 198/33 AA |
| 3,807,554 | 4/1974 | Satake | 209/116 |

FOREIGN PATENTS OR APPLICATIONS

| | | | |
|---|---|---|---|
| 1,303,171 | 7/1962 | France | 209/480 |
| 898,209 | 6/1962 | Great Britain | 209/466 |

*Primary Examiner*—John W. Huckert
*Assistant Examiner*—Stuart S. Levy
*Attorney, Agent, or Firm*—Browdy and Neimark

[57] ABSTRACT

A huller operating for separating hulled rice and unhulled rice and recirculating the unhulled rice to the supply hopper of the hull after husking it therein. To this end, the huller comprises a sorting or separating pan having a rough sorting surface and having the supply side in a higher elevation than the discharge side, a reciprocating device for reciprocating said pan in an obliquely upward direction when seen in front elevation, a vibration conveyor mounted integrally with the pan on the take-out opening for the separated unhulled rice and adapted to be reciprocated by reciprocation of said sorting pan, hulling means provided below the discharge opening of said vibration conveyor, and means for recirculating the rice thus husked to the supply side of the pan.

10 Claims, 14 Drawing Figures a higher position than that of the opposite side G', as shown in FIG. 5. This inclination is shown by an angle $\alpha$ in FIG. 5. Since this angle of lat-

HULLER

This invention relates to a huller.

The huller according to this invention employs in its part an oscillatory separating or sorting device for rice subjected in advance to a preliminary hulling operation and enables the long-grain species rice to be hulled with a higher performance than heretofore in spite of its small size.

The fully automatic husking or hulling apparatus so far known makes the use of a grain screen which is beset with a difficulty that the unhulled rice of the long-grain species can not be thereby separated smoothly.

The husking apparatuses for the cereals of long-grain species are formerly constructed as a combination of the oscillatory type separator and the independent huller and are large-sized and expensive. According to the hulling apparatus of this invention the small-sized oscillating separator having an especially high performance is housed in a small-size frame together with cooperate husking means.

Figure 1:
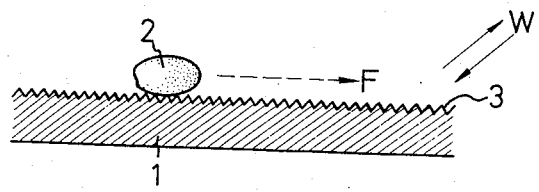
FIG. 1 shows diagrammatically the working principle of the sorting pan of the huller used for sorting of hulled and unhulled rice.

FIG. 1 shows a separating pan 1 having a rough surface 3 having numerous projections and indentations. When the grain or rice is placed on this pan 1 and the latter is vigorously reciprocated vertically upwardly as shown by an arrow mark of W, the rice is gradually displaced in the direction of F.

Figure 2:
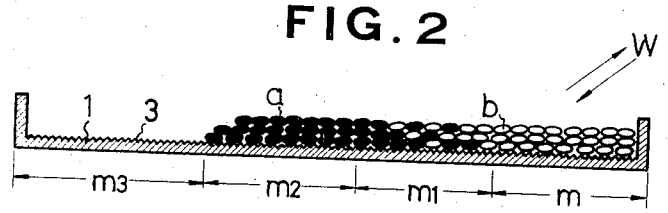
FIG. 2 is a front sectional view of the sorting pan used in the present invention.

When a mixture of unhulled rice $a$ and hulled rice $b$ is placed in thin layers on the upper surface of the pan 1, and the latter is vigorously reciprocated as before in the direction of W, the hulled rice $b$ having a smooth surface are sunk to a lower position than that of the unhulled rice having a rough surface. Thus, the hulled rice $b$ is brought into contact with the rough surface 3 and displaced rightwards due to fluid friction, as shown in FIG. 2. By the repetition of this reciprocating movement, the hulled rice is collected exclusively at the zone $m$, while the unhulled rice is collected at the opposite zone, as shown in FIG. 2. In FIG. 2, the unhulled rice is exclusively collected at the zone $m_2$ and the mixture of unhulled and hulled rice is collected at the zone $m_1$. Since the lowermost layer of the unhulled rice is kept in contact with the rough surface 3, it is subjected to the obliquely directed feed movement in a direction of W, as in the case of the hulled rice, but it is hindered from actual movement by the hulled rice collected there.

Figure 3:
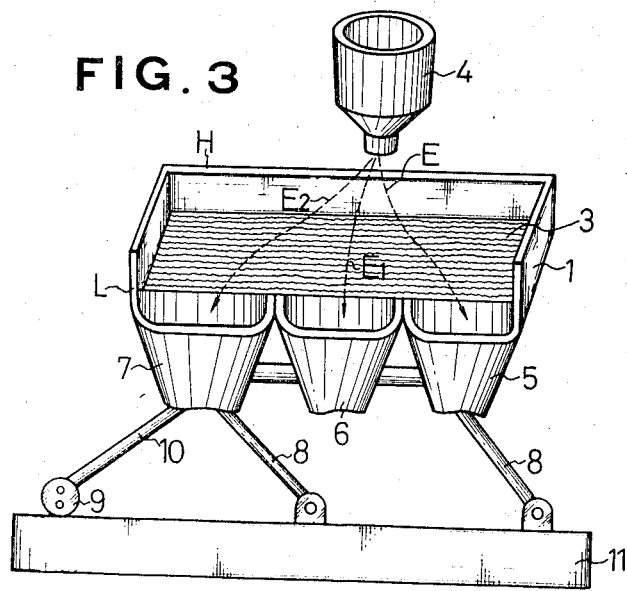
FIG. 3 is an overall front view of the sorting device especially showing the operation thereof.

In FIG. 3, the pan 1 has a rough surface 3 and has a supply side H and a discharge side respectively towards the rear and the front of the apparatus as seen in the drawing, said supply side H being provided at a slightly higher location than that of the discharge side L. A separator hopper 4 is provided on top of the supply side H, and discharge openings 5, 6, 7 for hulled rice, unhulled rice and the rice mixture are provided in juxtaposition to the discharge side L. Levers 8, 8 are axially mounted on a base 11 and pivotally mounted at their upper ends to the pan 1, while an eccentric wheel 9 is connected by a rod 10 to the pan 1. By rotation of the eccentric wheel 9, the pan 1 is subjected to a vigorous reciprocating movement in the direction of W through levers 8, 8 so that, as shown in FIG. 3, the hulled rice is discharged through the opening 5 along the dotted line E, while the unhulled rice and the rice mixture are discharged through openings 6, 7 along the dotted lines $E^1$ and $E^2$, respectively.

The apparatus shown in FIG. 3 serves satisfactorily for separating the hulled rice from the unhulled rice.

Figure 4:
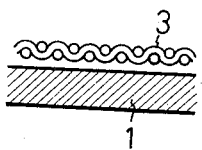
FIG. 4 shows a modified embodiment of the sorting pan.

FIG. 4 shows a modified example of the sorting surface 3 consisting of a fine-mesh screen affixed to the upper surface of the sorting pan 1.

Figure 5:
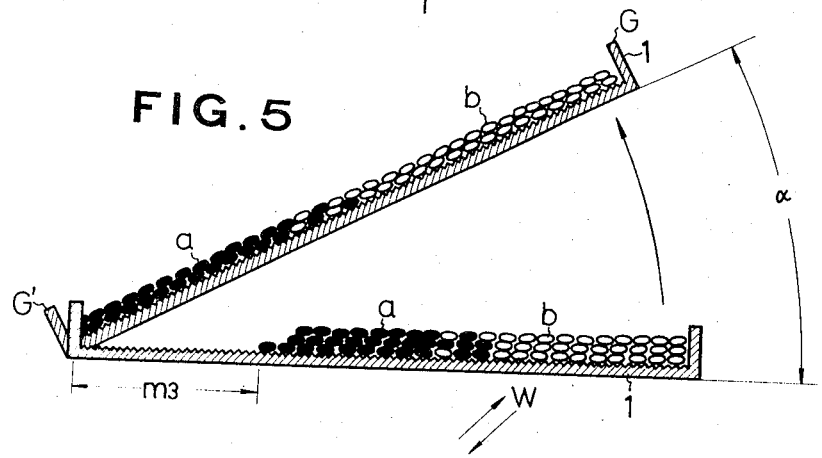
FIG. 5 shows a modified embodiment of the sorting pan.

In FIG. 2, the zone $m_3$ is devoid of supplied cereals 2 since the latter are offset rightwards by the obliquely directed feed movement. This can be obviated by having the side G of the take-out opening for the hulled rice 5 located in a higher position than that of the opposite side G', as shown in FIG. 5. This inclination is shown by an angle $\alpha$ in FIG. 5. Since this angle of lateral inclination $\alpha$ is varied occasionally, it is preferably adjustable in some way or other.

Figure 6:
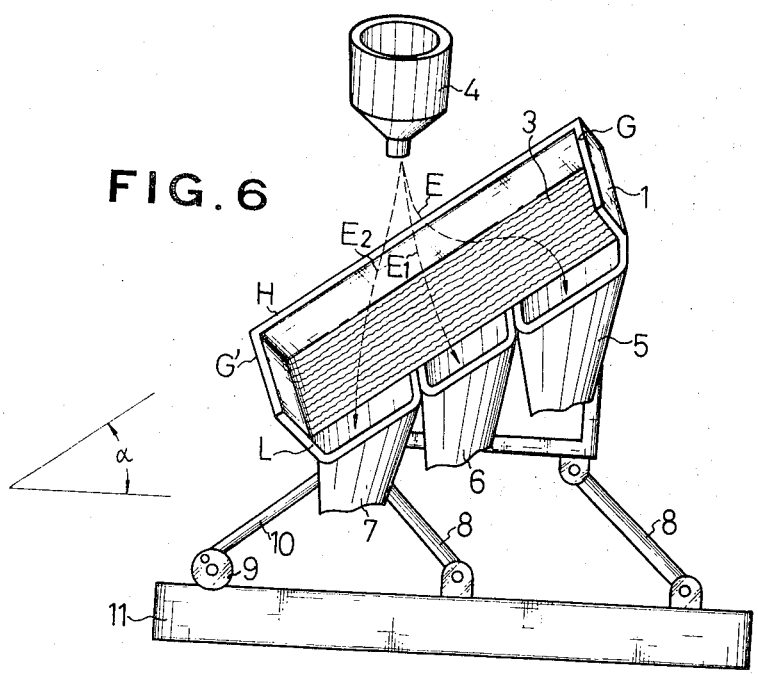
FIG. 6 is a front view of the sorting pan in which the modification according to FIG. 5 is utilized.

As shown in FIG. 6, the side G of the take-out opening 5 for hulled rice is higher than the opposite side G' and inclined thereto by the angle $\alpha$. The overall construction of the huller in which the separating devices explained briefly by referring to FIGS. 1 to 5 are utilized, will be explained by referring to FIGS. 7 to 14.

Figure 7:
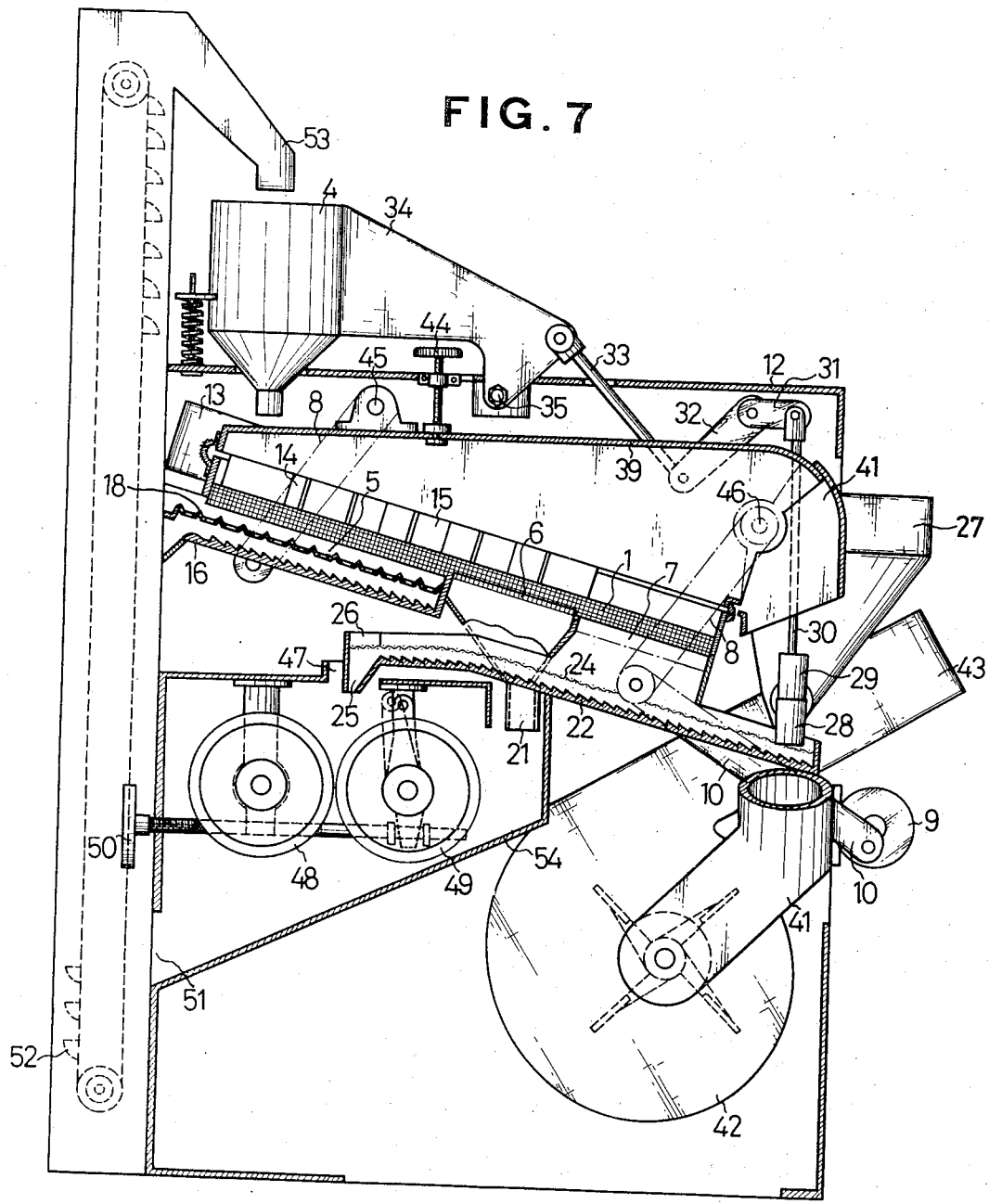
FIG. 7 is an overall longitudinal section of the huller.

The sorting pan 1 mounted within a frame 12 shown in FIG. 7 will be explained by referring to FIG. 8.

Figure 8:
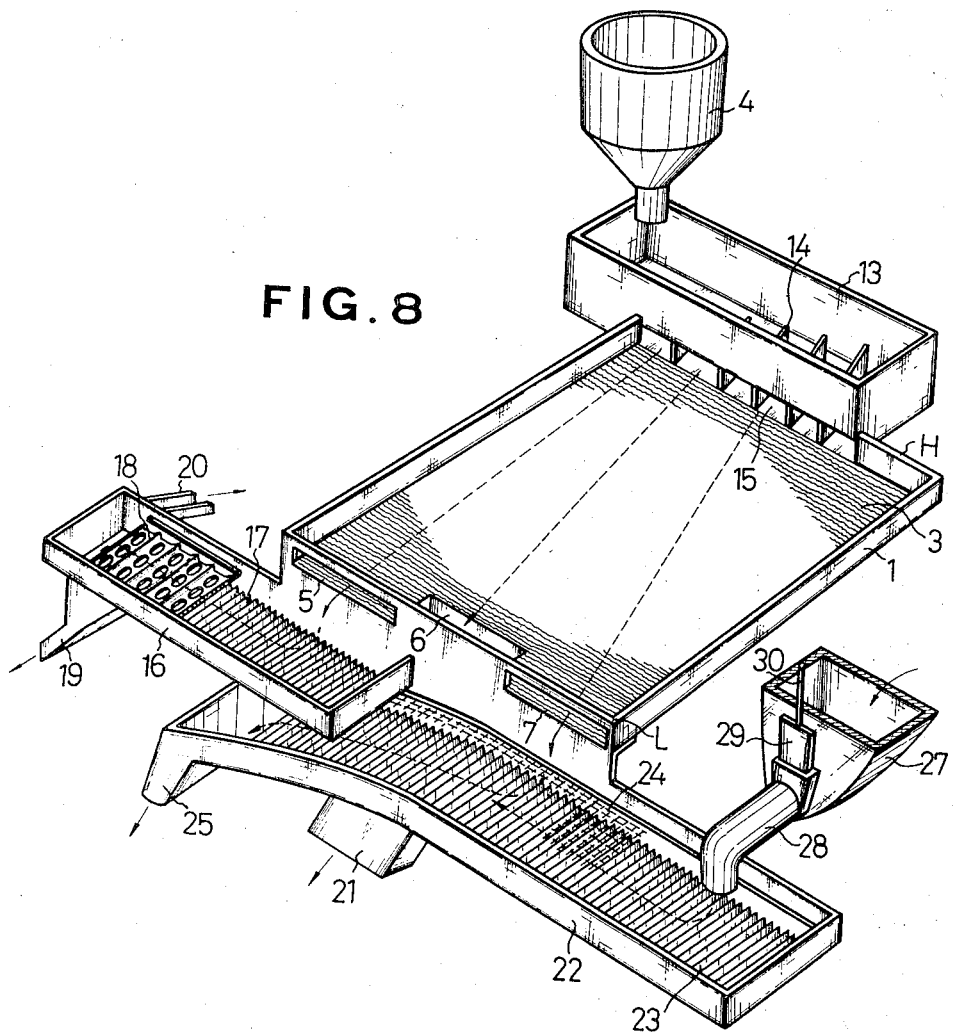
FIG. 8 is a perspective view of the sorting pan.
Figure 9:
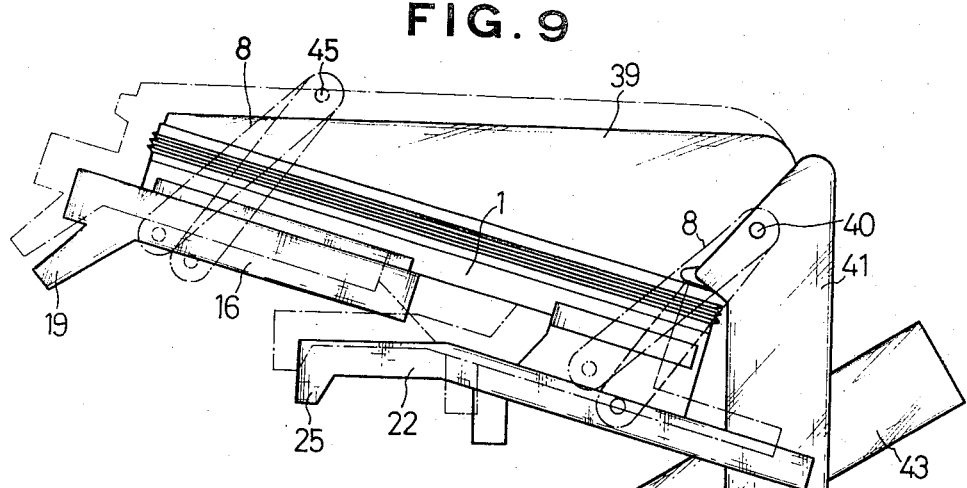
FIG. 9 is a front view of parts of the huller shown in FIG. 7.

In FIG. 8, the pan 1 has the shape of a shallow box and the supply side H thereof is at a higher elevation than the discharge side L. The pan 1 has an overall rough surface 3. Deflector means 13 are provided on the supply side H so that the material can be deflected on the overall pan surface, said means 13 including several guide plates 14. Supply openings 15 are provided to the lower part of the deflector means 13 in a laterally flared shape, and a hopper 4 is mounted on top of the deflector means 13. From left to right in FIG. 8, the discharge side L of the sorting pan 1 is provided with a take-out opening 5 for hulled rice, a take-out opening 6 for the rice mixture, and a take-out opening 7 for the unhulled rice. An oscillable conveyor 16 having a stepped delivery surface 17 is mounted integrally with the front side of the take-out opening 5. Straw-refuse removal plates 18 are mounted in parallel on the upper surface of conveyor 16 at fixed spaces from each other. Discharge opening 19 for the hulled rice and the discharge opening 20 for the straw refuse are provided to the left-hand end of conveyor 16. A vibration conveyor 22 having the construction substantially similar to that of the conveyor 16 is mounted ahead of the take-out opening 7. The numeral 23 in the drawing denotes a stepped delivery surface, the numeral 24 denotes a removal plate for the straw-refuse and the numeral 25 denotes a discharge opening for the unhulled rice. The vibration conveyor 22 has a discharge opening 26 for the straw refuse (FIG. 7). A hopper 21 is mounted to the take-out opening for the rice mixture 6. The vibration conveyor 22 is used simultaneously as a material receiving plate and provided, to this end, with a material supply hopper 27 at its right-hand side, with the supply trough 28 thereof opening on the conveyor 22. The numeral 29 denotes a valve. The surface of the pan 1 may be made rugged as at 3 or stuck with a fine-mesh screen. Alternatively, a number of ventilation openings 55 may be provided on the surface 1. The pan may therefore be divided roughly into that provided with openings 55 and that not provided with these openings. The suction unit can be dispensed with in the former type device, but it is necessary to provide in the latter type device, as will be explained by referring to FIGS. 7 and 9. A suction cover 39 made of metallic material is provided to cover the overall surface of the pan 1. The suction cover 39 is made of metallic material for the reason that it is used simultaneously as a support base to sustain the vibration of the pan 1. The cover 39 is rotatably mounted on one end of a suction tube 41 by a joint 40 and an adjustment bolt 44 is rotatably mounted at the lower end thereof to the upper surface of the cover 39, as shown in FIG. 7. The bolt 44 is threaded at its mid portion with a frame 12 so that, when the bolt 44 is rotated, the cover 39 is moved up and down with the joint 40 as its center. The upper part of the cover 39 carries a bearing 45 which carries in turn the upper end of the inclined lever 8, the lower end of which is carried on the pan 1. The upper end of another lever 8 is journaled to the joint 40 and the lower end thereof is journaled at 46 to the lower end of the pan 1. The one end of a rod 10 is journaled at said point 46 and the other end thereof is journaled to the eccentric wheel 9. The suction tube 41 is connected to a suction opening of a blower 42 which in turn is mounted to a vent tube 43.

The hopper 4 adapted to supply rice onto the pan 1 is secured to a mounting plate 34 which is rotatably mounted on a shaft 35 and connected to the valve 29 via rod 33, levers 31, 32 and rod 30. The numeral 37 denotes a spring, the numeral 36 a support plate and the numeral 38 a guide rod.

Figure 14:
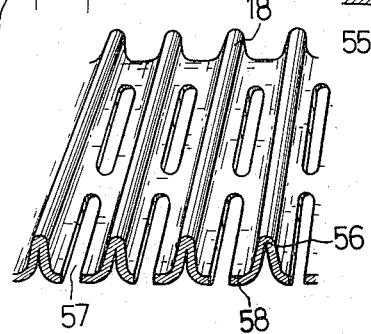
FIG. 14 is a perspective view of the chaff removing unit.

FIG. 14 shows, in an enlarged view, a straw-refuse removal plate 18 of the vibration conveyor 16 mounted to the take-out opening 5 for the hulled rice. The numeral 56 denotes an elevated portion, the numeral 58 denotes a depressed portion and the numeral 57 a slot.

Downwardly of the discharge opening 25 for the unhulled rice of the conveyor 22 provided to the take-out opening 7 for the unhulled rice, there are provided hulling rollers 48, 49, and an oblique plate 54 is mounted below said rollers 48, 49. The rice thus subjected to the second hulling is supplied into a lift 52 through a communication port 51 and introduced into a tank 4 through a discharge trough 53.

The discharge opening 21 for the rice mixture is opened on the oblique plate 54.

Figure 10:
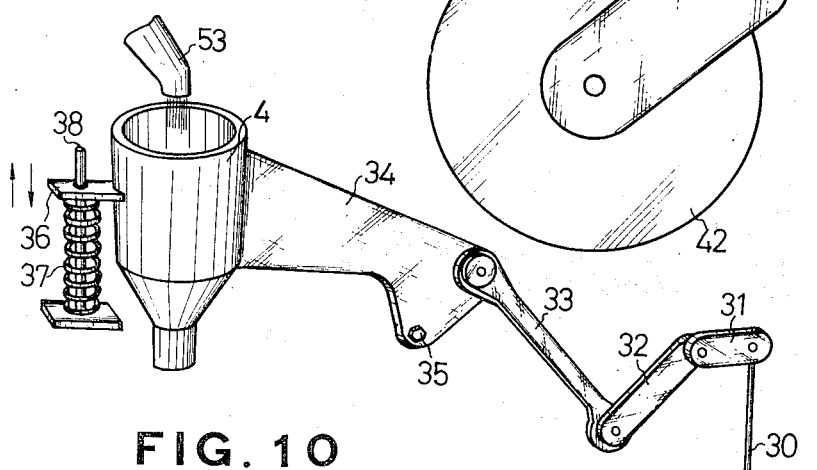
FIG. 10 is a perspective view of the material supply section of the huller shown in FIG. 7.

The operation of the device is as follows:

When the material is not supplied, hopper 4 is void, and assumes its upper position, under the force of the spring 37. Thus, the valve 29 is opened, as shown in FIG. 10. When the unhulled rice is charged into supply hopper 27, it drops on the conveyor 22 through supply trough 28. When the eccentric wheel 9 is revolved, the pan 1 is vigorously vibrated in the direction of W, with the bearing 45 and the joint 40 as center, so that the conveyor integrally mounted thereto is thereby vibrated. The dust and unhulled rice contained in the material is subjected to sifting and the unhulled rice so sifted is moved leftwards in the drawing under the action of the stepped delivery surface 23 until it falls through the discharge opening 25. The vibration conveyor 22 is shown to be elevated at its left-hand side (FIG. 7) but it may be mounted horizontally. The unhulled rice dropped through the discharge opening 25 is hulled by passing through rolls 48, 49 and introduced into a bucket elevator 52 through the oblique plate 54 and the communication port 51. Finally, it is introduced into the hopper 4 through discharge trough 53. The material that has passed these rolls 48, 49 is a mixture consisting of hulls, hulled rice and unhulled rice which has not undergone the hulling operation, all of which are supplied together into the supply hopper 4.

Figure 11:
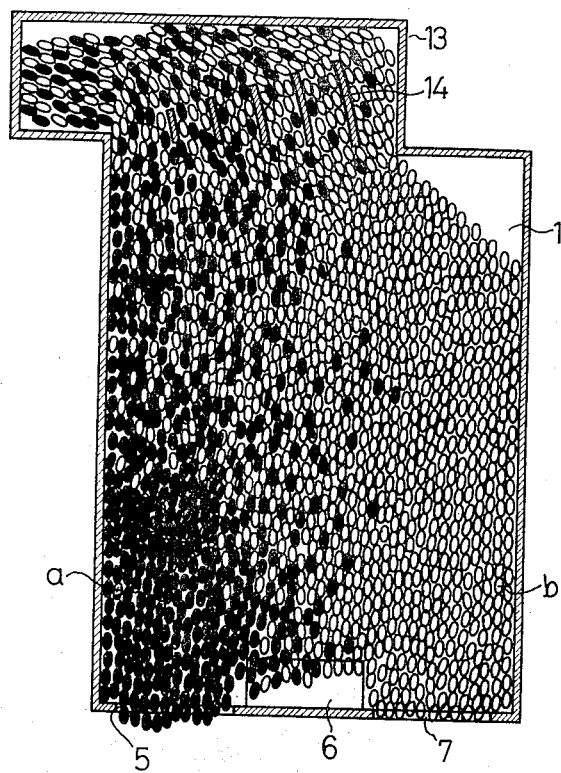
FIG. 11 is a plan view of the modified sorting pan.
Figure 12:
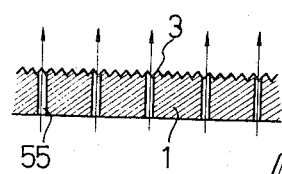
FIGS. 12 and 13 are sectional views of the modified sorting pan.
Figure 13:
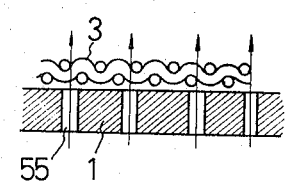

Downwardly of the supply hopper 4, there is provided a deflector means 13, by means of which the material supplied from the hopper 4 is deflected sidewise, as shown in FIG. 11, and allowed to flow down the overall sorting surface 1, to be separated into the hulled rice which is discharged through its discharge opening 19, the unhulled rice which is discharged through its discharge opening 7 and the mixture of hulled and unhulled rice which flows down the oblique plate 54 through take-out opening 6 for recirculation. The unhulled rice is again delivered from its take-out opening to the discharge opening 25 by the conveyor 22. During this time interval, blower 42 is kept in revolution, so as to remove the chaffs flowing on the pan 1 by suction, and to float the rice material slightly, to increase the effect of separation.

Supposing that the material is supplied continuously to the supply tank 27, the hulled rice is discharged, but the unhulled rice discharged through the take-out openings 6 and 7 is recirculated, so that the rice flowing down the pan 1 is naturally increased in its quantity. When the quantity of this rice is increased excessively, the effect of separation as described by referring to FIG. 6 is necessarily lowered. According to this invention, this rice quantity can be adjusted automatically in a way that the hopper 4 is carried by a spring 37 and that, when the rice quantity in the hopper 4 exceeds a certain limit, the valve 29 is closed under the weight of the hopper 4 as shown in FIG. 10 to interfere with the supply of new material thereto.

The adjustment of the angle α that the line connecting the sides G and G' makes with the horizontal is carried out with the aid of an adjustment bolt 44. When the bolt 44 is rotated, the sorting pan 1 is revolved in its entirety with the joint 40 as center and the angle α is thus adjusted to an adequate value.

The suction cover 39 is also used as a base on which the pan 1 is reciprocated in the direction W. In general, the pan 1 has a considerable surface, and the rice is distributed on this surface in at least three layers, so that the pan is obliged to support a considerable load. When the pan 1 is vigorously reciprocated in the direction of W, as shown in FIGS. 1 to 6, the bench floor is subjected to vibration. Therefore, the frame 12 and the oblique rods 8, 8 are required to have considerable strength. According to this invention, the suction cover 39 is made of metallic material and press-worked into a bent shape so as to bear the vibration and to ensure required strength.

The effects to be derived from the present invention are summarized as follows.

1. The mixture of hulled and unhulled rice is separated into its components by subjecting it to an obliquely upward direction or in the direction of W to ensure a separating efficiency unattainable with the prior apparatus. The unhulled rice take-out opening 7 fitted to the pan 1 is fitted integrally with a vibration conveyor 22 so that the unhulled rice is displaced at first laterally and then allowed to drop on the hulling rolls 48, 49, so that the belt or bucket conveyors adapted to transfer the unhulled rice from the pan 1 to the rolls 48, 49 can be dispensed with, and the two devices can be accomodated within a frame 12 of a smaller size. In addition, since the conveyor 22 is of the vibration type, it can transfer the rice obliquely upwardly, resulting in minimizing the space occupied by the conveyor.

2. The hulled rice take-out opening 5 of the pan 1 is fitted integrally with a vibration conveyor 16, so that the latter can be vibrated with the vibration of the pan 1. The hulled rice taken from the take-out opening 5 can thus be conveyed to the desired place outside of the huller by virtue of the vibratory movement of the conveyor 16. In other words, the vibration conveyor 16 is oscillated by the eccentric wheel 9 together with the conveyor 22.

3. The hulled rice take-out opening 5 of the separating pan 1 is elevated relative to the unhulled rice take-out opening 7 by an angle α, the supplied rice can be uniformly distributed on the overall surface of the pan 1.

Since the side G is mounted in a higher elevation than the side G', the rice can be uniformly distributed on the pan in accordance with the principle described by referring to FIG. 5.

4. The hopper 4 mounted on the top of the material supply side H of the pan 1 is carried resiliently by a spring 37 and is adjustable in its elevation responsive to the quantity of rice charged into the hopper 4. Moreover, the supply hopper 27 is fitted with an adjustment valve 29 adapted to be closed and opened responsive to the vertical displacement of the hopper 4, so that the quantity of the supplied material can be automatically adjusted, and the material is supplied to the pan 1 in an adequate quantity.

5. According to a preferred form of the present invention, the pan 1 has ventilation openings 55 so that the fluffy dust and the like may be blown off from the surface of the pan 1 to increase separating effect.

6. According to a preferred form of the present invention, the pan 1 is covered in its entirety with a suction cover 39 made of metallic material. This cover 39 can be used simultaneously for supporting the pan 1.

7. The deflection means 13 is fitted to the supply side H of the pan 1, so that the rice can be uniformly dispersed on the pan 1 for better sorting operation.

8. Straw refuse or hulls can be removed by the removal plates 24, 18 provided to the vibration conveyors 16, 22.

What is claimed is:

1. In a huller comprising: separating means for separating hulled grain from unhulled grain, including:
   a separating pan having a rough sorting surface and a supply side and a discharge side, said supply side being elevated above said discharge side;
   a first discharge opening for hulled grain located in said discharge side;
   a second discharge opening for a mixture of hulled grain and unhulled grain located in said discharge side;
   a third discharge opening for unhulled grain located in said discharge side;
   said separating pan being further inclined such that said first discharge opening is elevated above second ond discharge opening and said second discharge opening is elevated above said third discharge opening;
   means for reciprocating said separating pan in an obliquely upward direction with reference to the plane of said sorting surface;
   means adjacent said supply side for supplying hulled and unhulled grain to said separating surface;
   means for removing said hulled grain from said first discharge opening;
   means for removing said mixture from said second discharge opening; and
   means for removing said unhulled grain from said third discharge opening;
   the improvement wherein said means for removing said unhulled grain comprises:
   a vibration conveyor integrally mounted at one end thereof to said hulled grain discharge opening, said vibration conveyor being reciprocated by said means for reciprocating said separating pan;
   a discharge funnel at the other end of said vibration conveyor;
   said reciprocating vibration conveyor being operative to laterally upwardly transfer said unhulled grain from said unhulled grain discharge opening to said discharge funnel; and
   hulling means spaced below said discharge funnel to receive and hull said unhulled grain.

2. A huller as claimed in claim 1 wherein said hulled grain discharge opening is provided with means for laterally and vibratorily transfering the hulled grain.

3. A huller as claimed in claim 2 wherein: said transfering means includes:
   a trough containing first and second ends;
   a stepped delivery surface at said first end; and
   a straw refuse removal plate at said second end.

4. A huller as claimed in claim 1 wherein said vibration conveyor has said other end thereof at a higher elevation than said one end thereof.

5. A huller as claimed in claim 1 further including:
   a separator hopper pivotally mounted on top of said supply side of said separating pan, and vertically movable responsive to the quantity of the grain charged into said separator hopper; and a grain supply hopper having an opening spaced above said one end of said vibration conveyor and a movable valve over said opening, means for mounting said valve such that said valve will be opened and closed responsive to the vertical movement of said separator hopper.

6. A huller as claimed in claim 5, further comprising: a deflection means, mounted on said supply side of said separating pan, for laterally dispersing said grain supplied from said separating hopper.

7. A huller as claimed in claim 1, wherein numerous ventilation openings are provided to said separating pan.

8. A huller as claimed in claim 1, wherein the separating pan is covered in its entirety with a metallic suction cover.

9. A huller as claimed in claim 8, wherein: an adjustment bolt for adjusting the inclination of said cover and said attached separating pan is connected to said cover.

10. A huller as claimed in claim 1 wherein said vibration conveyor includes a stepped delivery surface at said one end thereof and provided with a straw refuse removal plate at said other end thereof.

* * * * *

UNITED STATES PATENT OFFICE
CERTIFICATE OF CORRECTION

PATENT NO. : 3,857,333
DATED : December 31, 1974
INVENTOR(S) : Toshihiko Satake

It is certified that error appears in the above-identified patent and that said Letters Patent are hereby corrected as shown below:

Column 2, lines 23 and 24 "$E^1$" and "$E^2$" should read --$E_1$-- and --$E_2$--.

Column 6, line 37 "hulled" should read --unhulled--.

Signed and sealed this 6th day of May 1975.

(SEAL)
Attest:

RUTH C. MASON
Attesting Officer

C. MARSHALL DANN
Commissioner of Patents
and Trademarks